(12) United States Patent
Pekelny et al.

(10) Patent No.: US 10,846,923 B2
(45) Date of Patent: Nov. 24, 2020

(54) FUSION OF DEPTH IMAGES INTO GLOBAL VOLUMES

(71) Applicant: Microsoft Technology Licensing, LLC, Redmond, WA (US)

(72) Inventors: Yuri Pekelny, Seattle, WA (US); Ali Osman Ulusoy, Seattle, WA (US); Salah Eddine Nouri, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

(21) Appl. No.: 15/988,994

(22) Filed: May 24, 2018

(65) Prior Publication Data

US 2019/0362544 A1 Nov. 28, 2019

(51) Int. Cl.
| | | |
|---|---|---|
| *G06T 17/05* | (2011.01) | |
| *G06T 7/55* | (2017.01) | |
| *G06T 15/08* | (2011.01) | |
| *G06K 9/00* | (2006.01) | |
| *G06K 9/03* | (2006.01) | |
| *G06T 15/20* | (2011.01) | |

(Continued)

(52) U.S. Cl.
CPC .......... *G06T 17/05* (2013.01); *G06K 9/00664* (2013.01); *G06K 9/03* (2013.01); *G06T 7/55* (2017.01); *G06T 15/08* (2013.01); *G06T 15/205* (2013.01); *G06T 17/20* (2013.01); *G06T 19/20* (2013.01); *G06T 2207/10028* (2013.01); *G06T 2207/20084* (2013.01); *G06T 2207/20221* (2013.01)

(58) Field of Classification Search
CPC ............ G06T 7/55; G06T 17/05; G06T 15/08
See application file for complete search history.

(56) References Cited

U.S. PATENT DOCUMENTS

| | | |
|---|---|---|
| 8,466,915 B1 | 6/2013 | Frueh |
| 9,300,951 B2 | 3/2016 | Krah |

(Continued)

OTHER PUBLICATIONS

"Spatial mapping design", Retrieved from: https://web.archive.org/web/20170710164145/https:/developer.microsoft.com/en-us/windows/mixed-reality/spatial_mapping_design, Jul. 10, 2017, 10 Pages.

(Continued)

*Primary Examiner* — Matthew Salvucci
(74) *Attorney, Agent, or Firm* — Alleman Hall Creasman & Tuttle LLP

(57) ABSTRACT

A method for spatial mapping of an environment comprises receiving a plurality of depth images of an environment via an imaging device, each depth image associated with a local coordinate system. For each local coordinate system, each associated depth image is fused to generate a local volume. Each local volume is then fused into a global volume having a global coordinate system, and then a surface mesh is extracted for the global volume. One or more regions of inconsistency within the global volume are determined and localized to one or more erroneous local volumes. The one or more erroneous local volumes are unfused from the global volume, and then non-erroneous local volumes are re-fused into a corrected global volume. By using a two-step fusion process, regions of inconsistency, such as mirror reflections, may be corrected without requiring reconstruction of the entire global volume.

20 Claims, 10 Drawing Sheets

(51) Int. Cl.
*G06T 17/20* (2006.01)
*G06T 19/20* (2011.01)

(56) References Cited

U.S. PATENT DOCUMENTS

| | | | |
|---|---|---|---|
| 9,373,149 B2 | 6/2016 | Abhyanker | |
| 2008/0002880 A1 | 1/2008 | Coleby et al. | |
| 2012/0194517 A1* | 8/2012 | Izadi | G06T 17/00 345/420 |
| 2014/0099017 A1* | 4/2014 | Tsai | G06T 17/00 382/154 |
| 2014/0285631 A1 | 9/2014 | Janky et al. | |
| 2018/0096503 A1* | 4/2018 | Kaehler | G02B 27/0172 |

OTHER PUBLICATIONS

Kashammer, et al., "Mirror Identification and Correction of 3d Point Clouds", In Proceedings of International Archives of Photogrammetry, Remote Sensing and Spatial Information Sciences, vol. 40, No. 5, Feb. 25, 2015, pp. 109-114.

Lorenson, et al., "Marching cubes: A high resolution 3D surface construction algorithm", In Proceedings of the 14th annual conference on Computer graphics and interactive techniques, Jul. 1987, pp. 163-169.

Mallick, et al., "Estimation of the orientation and distance of a mirror from Kinect depth data", In Proceedings of Fourth National Conference on Computer Vision, Pattern Recognition, Image Processing and Graphics, Dec. 18, 2013, 4 Pages.

Newcombe, et al., "KinectFusion: Real-Time Dense Surface Mapping and Tracking", In Proceedings of the 10th International Symposium on Mixed and Augmented Reality, Oct. 26, 2011, 10 Pages.

Schaefer et al., "Manifold dual contouring", In Journal of IEEE Transactions on Visualization and Computer Graphics, vol. 13, No. 3, May 2007, pp. 1-10.

Ochmann, et al., "Automatic Reconstruction of Parametric Building Models From Indoor Point Clouds", In Journal Computer & Graphics, vol. 54, Feb. 1, 2016, pp. 94-103.

"International Search Report and Written Opinion Issued in PCT Application No. PCT/US19/032076", dated Aug. 6, 2019, 12 Pages.

* cited by examiner

FUSION OF DEPTH IMAGES INTO GLOBAL VOLUMES

BACKGROUND

Depth cameras may be used to spatially map a scene or environment. A mobile depth camera may allow the scene or environment to be imaged from various positions and poses. Individual depth images may then be fused together to generate a global surface model of the scene or environment in real-time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for spatial mapping of an environment comprises receiving a plurality of depth images of an environment via an imaging device, each depth image associated with a local coordinate system. For each local coordinate system, each associated depth image is fused to generate a local volume. Each local volume is then fused into a global volume having a global coordinate system, and then a surface mesh is extracted for the global volume. One or more regions of inconsistency within the global volume are determined and localized to one or more erroneous local volumes. The one or more erroneous local volumes are unfused from the global volume, and then non-erroneous local volumes are re-fused into a corrected global volume. By using a two-step fusion process, regions of inconsistency, such as mirror reflections, may be corrected without requiring reconstruction of the entire global volume.

DETAILED DESCRIPTION

Figure 1:
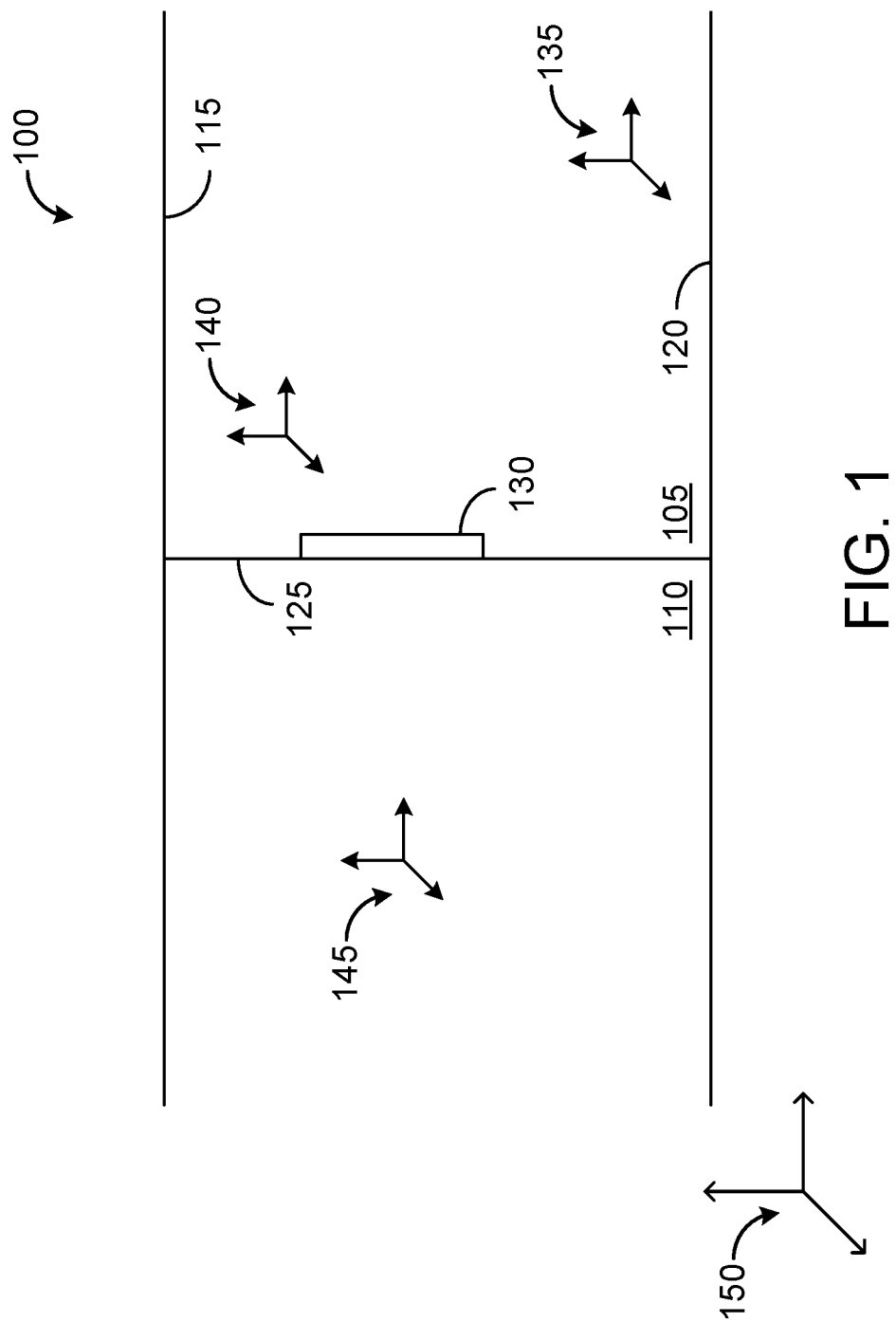
FIG. 1 shows an example head-mounted display system.

This disclosure relates to problems that occur when attempting to obtain an accurate digital 3D representation (e.g., spatial mapping) of an environment. In particular, this disclosure addresses problems that occur during spatial mapping of environments that contain mirrors.

Spatial mapping of an environment is typically based on measurements received from depth sensing hardware (e.g. LIDAR or depth cameras), or from a digital structure generated via multi-view stereo algorithms using traditional video or photo camera input. When using a depth camera, a series of depth maps are generated that represent a distance per pixel between the depth camera and a surface within the environment. Depth maps may be converted to a 3D point cloud using camera calibration. Multiple 3D point clouds may then be fused into a 3D map or digital representation of the environment.

Typically, a depth camera takes between 1 and 30 depth images of an environment each second. When using a depth camera associated with a head-mounted display (HMD), Simultaneous Localization and Mapping (SLAM) methods may be used to calculate a 6 Degrees of Freedom (6DoF) pose of the depth camera within the environment for each image. This allows each of the depth images to be mapped to a common coordinate system, and enables an assumption that a position within the common coordinate system is accurately known for each input depth image.

However, HMDs typically do not operate using one global coordinate system. It can be challenging to track all movements of the depth camera when imaging a large room or building from corner to corner. When a coordinate system is generated, the precision of the assigned HMD position degrades as the HMD moves away from its original position. Thus, generating a single coordinate system for an environment is currently infeasible.

Instead, the global coordinate system may be split into smaller, local coordinate systems, also called anchors (or key frames). One local coordinate system is created at a position within the environment. When the user migrates from that position, another local coordinate system is created, typically every 1-2 meters. The local coordinate systems may be connected via one or more transformations. The transformations may improve with additional data/iterations, improving the global coordinate system and making it more stable. Both the local coordinate systems and global coordinate system may be world-locked, and may also be edited and improved over time.

When positioned within each local coordinate system, the depth imaging device takes depth images of the environment. Feature points may be extracted from the depth images (e.g., corners, 3D objects). Neighboring local coordinate systems may overlap, and thus may share some features. As such, the relative positions of two local coordinate systems may be determined using 3D geometry based on the common features. The depth images for the local coordinate systems may then be fused into a global volume with a global coordinate system, and a surface mesh for the environment extracted from the global volume.

As an example, FIG. 1 shows a use environment 100 that may be imaged by a mobile depth camera, such as an HMD. Use environment 100 includes a first room 105 and a second room 110, including first wall 115, a second wall 120, and a third wall 125. First room 105 includes a mirror 130 positioned on a face of third wall 125. Use environment 100 includes three anchors: first local coordinate system 135, second local coordinate system 140, and third local coordinate system 145. First local coordinate system 135, second local coordinate system 140, and third local coordinate system 145 may be fused to generate global coordinate system 150.

The position of a depth imaging device may thus be accurate within nearby local coordinate systems, but may accumulate drift and positional error as distance increases from any given local reference. As such, the depth imaging device may return to a local coordinate system but record new data that is offset from the original data recorded at that local coordinate system. This may generate inconsistencies within the 3D map reconstruction of the environment, such as the appearance of a double floor. The predominant solution to this problem has been to adjust the transformations between each local coordinate system, thus necessitating a re-fusion of the entire global volume. This may be an extremely costly computational process.

Another problem can occur when a mirror is within view of the depth imaging device, as a reflection of the environment can be recorded. spatial mapping algorithms that use this data as input thus reconstruct a virtual, reflected scene behind the mirror, thereby destroying the 3D reconstruction of the scene physically located behind the mirror (e.g., the adjacent room).

Herein, systems and methods are described wherein the fusion of depth image data occurs at two distinct steps. In a first step, depth images for each local coordinate system (e.g., anchor) are fused into a local volume. Then, in a second step, the local volumes are fused into one global volume having a global coordinate system. In this way, a local volume can be unfused from the global coordinate system, corrected or withdrawn, and the global volume may then be re-fused. Such a procedure is advantageous over current, one-step fusion methods, which require re-fusion of all depth images when erroneous data is determined. With a two-step fusion process, computational savings is realized (both time and total processor power), as non-erroneous local volumes can be maintained without engaging in further fusing operations. Additionally, fusing a set of depth images into a local volume allows for recovery of data for that local volume if it is destroyed by erroneous data from an adjacent volume. For example, when mirrors are detected, the destroyed geometry may be repaired without requiring the space behind the mirror to be re-imaged.

Figure 2:
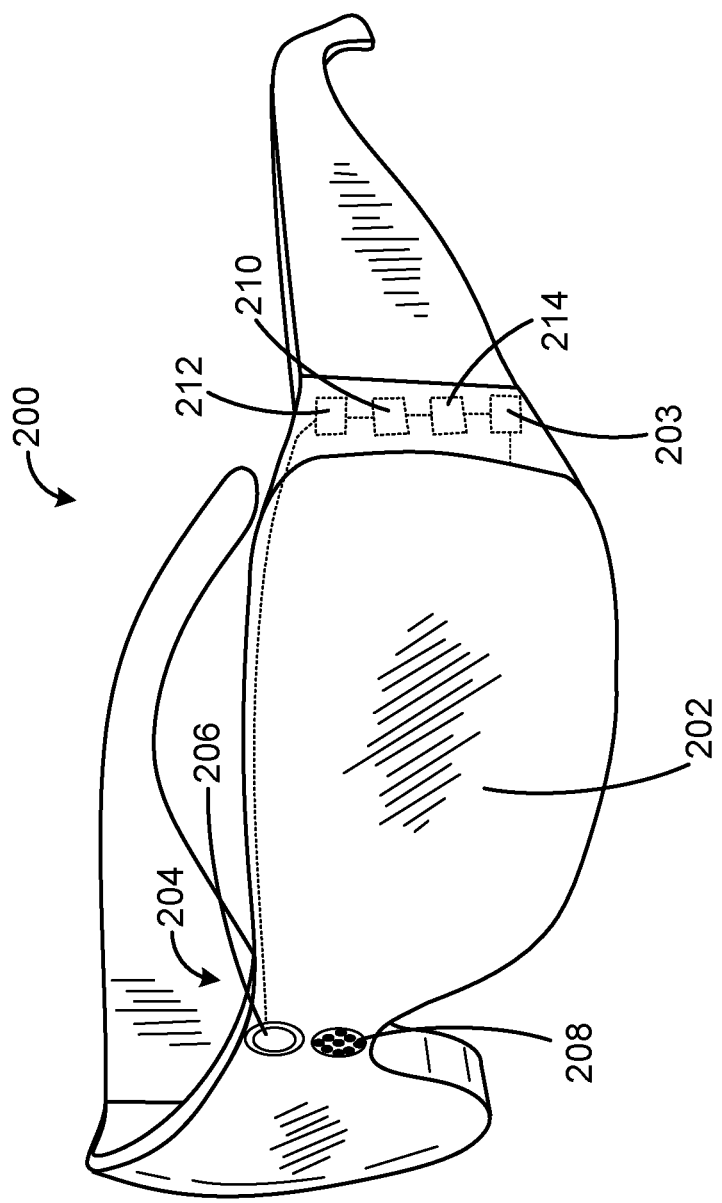
FIG. 2 shows an example use environment.

FIG. 2 depicts an example head-mounted display system 200 that may be used to generate depth images of an environment. The head-mounted display system 200 takes the form of a pair of wearable glasses or goggles. The head-mounted display system 200 includes a see-through display 202 that may be configured to visually augment an appearance of a physical environment to a user viewing the physical environment through the see-through display.

For example, the appearance of the real-world background may be augmented by graphical content that may be presented with the see-through display 202 such that the graphical content may appear to be in front of the real-world background. In particular, an image production system 203 may be configured to display an image of a virtual object with the see-through display 202.

In some configurations, the head mounted display system may be an additive display system in which holographic light may be displayed on the see-through display. For example, one or more partially transparent pixels can emit light to a user's eye. The user can view real-world objects through and/or around the pixel, but the emitted light can seemingly illuminate the background objects viewed through and/or around the pixel.

The head-mounted display system 200 includes an optical sensor system 204 that may include one or more optical sensors. In one example, the optical sensor system 204 includes an inward facing optical sensor 206 and an outward facing optical sensor 208. The inward facing optical sensor may be configured to perform gaze detection or other analysis on the user's eyes. The outward facing optical sensor may be configured to detect the real-world background from a similar vantage point (e.g., line of sight) as observed by the user through see-through display 202. In some configurations, the sensor subsystem may include two or more different inward and/or outward facing optical sensors (e.g., outward facing color camera and outward facing depth camera).

The head-mounted display system 200 may further include a position sensor system 210 that may include one or more position sensors (e.g., accelerometer(s), gyroscope(s), magnetometer(s), global positioning system(s), multilateration tracker(s), etc.) that output position sensor information useable to assess a position, orientation, and/or movement of the relevant sensor.

Optical sensor information received from the optical sensor system 204 and/or position sensor information received from position sensor system 210 may be used to assess a position and orientation of the vantage point of the see-through display relative to other environmental objects. In some configurations, the position and orientation of the vantage point may be characterized with six degrees of freedom (e.g., 6DOF world-space X, Y, Z, pitch, roll, yaw). The vantage point may be characterized globally or independent of the real-world background. The position and/or orientation may be determined with an on-board computing system (e.g., on-board computing system 212) and/or an off-board computing system.

Furthermore, the optical sensor information and the position sensor information may be used by a computing system to perform analysis of the real-world background, such as depth analysis, surface reconstruction, environmental color and lighting analysis, or other suitable operations. The optical and positional sensor information may be used to create a virtual model of the real-world background using a 3D environment modeling system 214, which may be part of on-board computing system 212. In some configurations, the position and orientation of the optical sensor vantage point may be characterized relative to the virtual space. Moreover, the virtual model may be used to determine positions of virtual objects in the virtual space.

A virtual model of the real-world background generated by 3D environment modeling system 214 may be saved, transmitted to another computing device, and/or rendered into a viewable model (e.g., by image production system 203 or a remote image production system). As described herein, the virtual model may be updated based on changes to the real-world background as detected by optical sensor system 204, or other optical detection systems.

Figure 3:
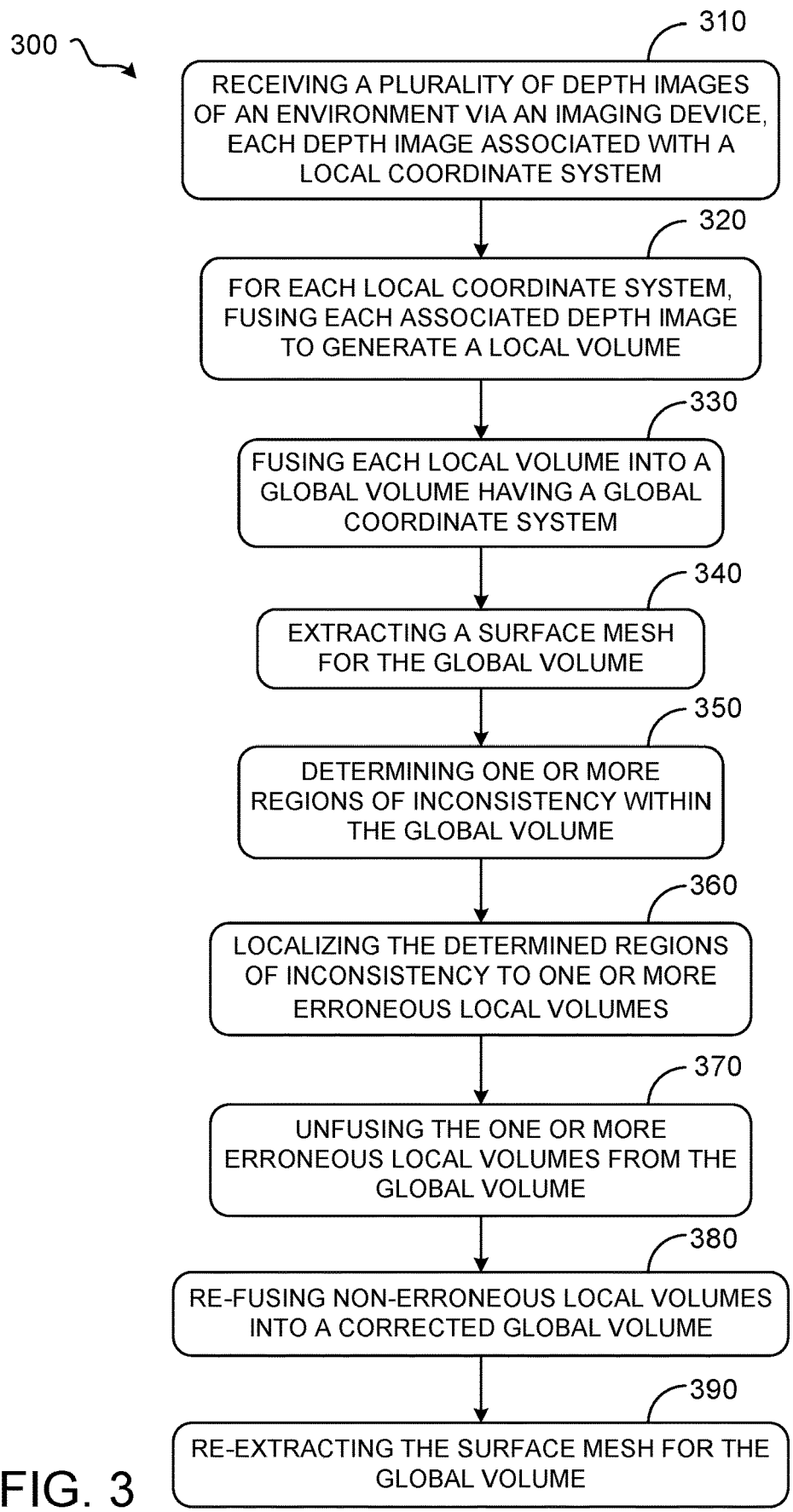
FIG. 3 shows an example method for spatial mapping of an environment.

FIG. 3 shows a flow-chart for an example method 300 for spatial mapping of an environment, such as environment 100. Method 300 may be performed by a computing device communicatively coupled to an imaging device, such as head-mounted display system 200.

At 310, method 300 includes receiving a plurality of depth images of an environment via an imaging device, each depth image associated with a local coordinate system. The imaging device may include one or more depth cameras, stereo camera pairs, multi-view stereo imaging devices, etc. Each local coordinate system may be world-locked to the environment, though the local coordinate system may be adjusted and updated over time as new depth images are acquired.

As the imaging device moves through the environment, new local coordinate systems are generated, such as local coordinate systems 135, 140, and 145. When the imaging device is within a local coordinate system, each acquired depth image is associated with that local coordinate system. If the imaging device leaves and returns to a local coordinate system, newly acquired depth images are associated with that local coordinate system. In other words, each acquired depth image is associated with a single local coordinate system.

At 320, method 300 includes, for each local coordinate system, fusing each associated depth image to generate a local volume. For example, for every input depth image frame, a previous frame be identified that was taken from a similar imaging device pose (e.g., position, direction) within the same local coordinate system. Each such input depth image frame may be grouped and fused together within a local volume. If no similar input depth image frames are found, a new local volume may be created and associated with the camera pose for the newly acquired depth image frame. Responsive to receiving a new depth image, the new depth image may be fused into a local volume for the local coordinate system associated with the new depth image. In other words, newly acquired depth image frames may be fused to the local volume attached to the imaging device's current local coordinate system.

Figure 4:
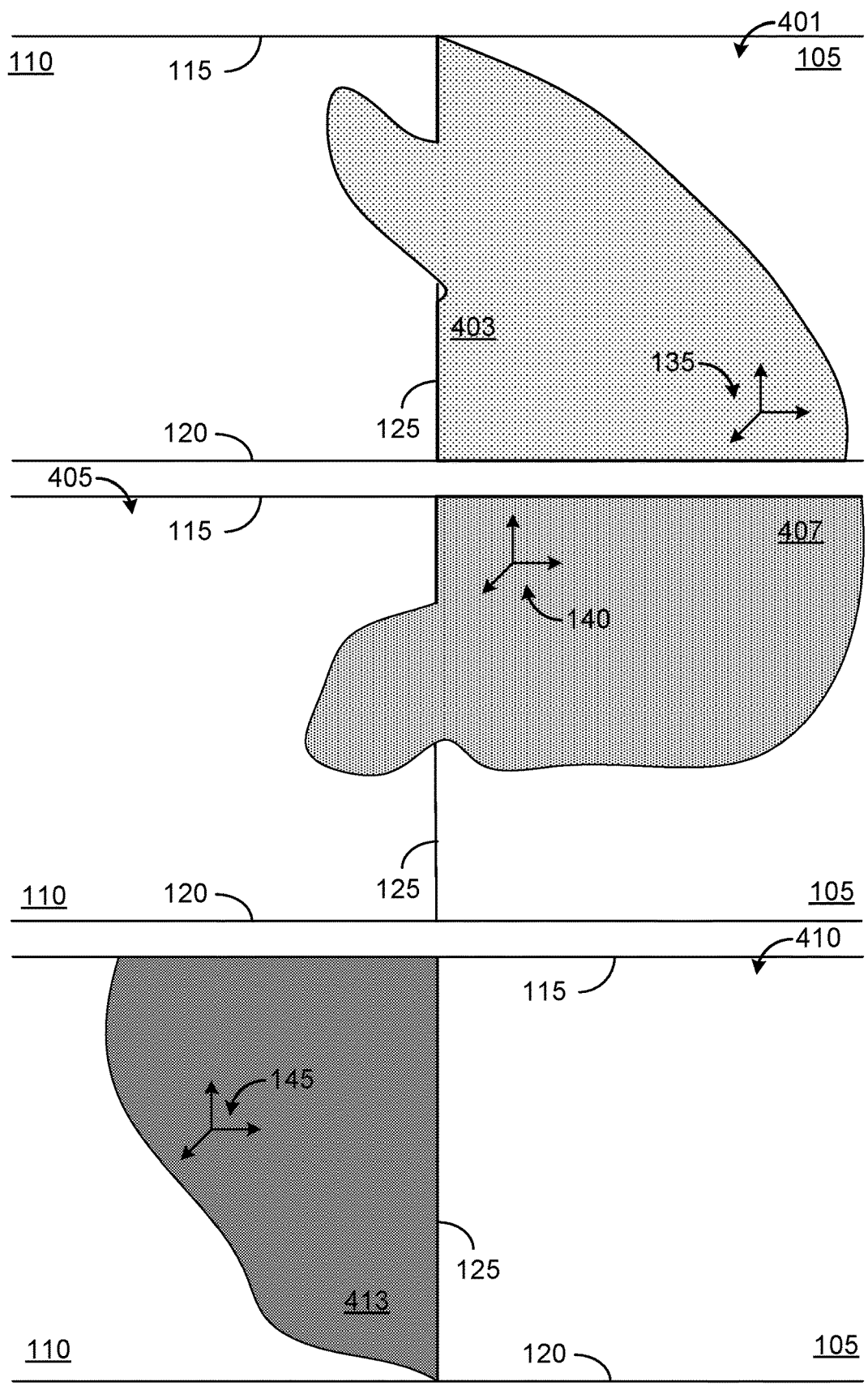
FIG. 4 shows example local volumes within a use environment.

FIG. 4 shows example local volumes within use environment 100. At 401, first local volume 403 is shown associated with first local coordinate system 135. At 405, second local volume 407 is shown associated with second local coordinate system 140. At 410, third local volume 413 is shown associated with third local coordinate system 145. First local volume 403 includes portions of walls 120 and 125, and of first room 105. Second local volume 407 includes portions of walls 115 and 125, and of first room 105. Third local volume 413 includes portions of walls 115 and 125, and of second room 110. Both first local volume 402 and second local volume 407 include an additional region that was detected within reflections from mirror 130 (not shown), and that appears to be within second room 110.

Each local volume may comprise a plurality of voxels. Each voxel may include data representative of the accumulated input depth, e.g. Truncated Signed Distance Function (TSDF) or point cloud. A signed distance function value calculation gives the value of the distance between the current voxel and a nearest corresponding point (absolute or constrained to camera perspective) on a surface imaged by the imaging device, and is signed such that voxels outside (i.e. in front of) the corresponding point (from the camera's perspective) are given a positive distance, and voxels inside (i.e. behind) the corresponding point (from the camera's perspective) are given a negative distance. A value of zero indicates that the associated voxel is exactly coincident with the corresponding point.

The SDF value may then be normalized to a predefined distance value. In one example, this predefined value can be a small distance such as 5 cm, although any suitable value can be used. It is then determined whether the normalized distance is greater than a positive threshold value (if the signed distance is positive) or less than a negative threshold value (if the signed distance is negative). If so, then the SDF values are truncated to maximum or minimum values. For example, if the normalized distance is greater than the positive threshold value, then the value can be truncated at +1 (the positive threshold value after normalizing), and if the normalized distance is less than the negative threshold value, then the value can be truncated at −1 (the negative threshold value after normalizing). The result of this calculation is known as a truncated signed distance function value (TSDF).

Returning to FIG. 3, at 330, method 300 includes fusing each local volume into a global volume having a global coordinate system. Each local coordinate system may be linked to each other via one or more transformations. Each transformation may be based on shared feature points between two or more local volumes. In other words, a transformation may be generated between two local coordinate systems based on two adjacent, overlapping local volumes (e.g., local volumes 403 and 407) having shared feature points (e.g., portions of wall 125, the leg of a chair, corner of a table, etc.). Such transformations may be iterative, and may be adjusted over time, for example, as new depth images of the environment are acquired. A plurality of transformations between local coordinate systems may be performed to generate a global coordinate system. A such, adjusting one or more components of a first transformation (magnitude and/or direction of a vector and/or rotation) may necessitate adjusting one or more components of a second transformation between other local coordinate systems. In some examples, a local coordinate system being displaced from one or more adjacent coordinate systems as the result of an adjusted transformation may signify an inconsistency in the local volume or underlying depth images.

Overlapping local volumes that include a shared subset of voxels may be combined by using a weighted average for signed distance field values for voxels within overlapping regions. The assigned weights may be based on data quality (e.g., lower standard deviations for a voxel receive higher weight), data quantity (e.g., some local volumes may include a greater number of depth images than others), certainty function, data resolution, etc.

Figure 5:
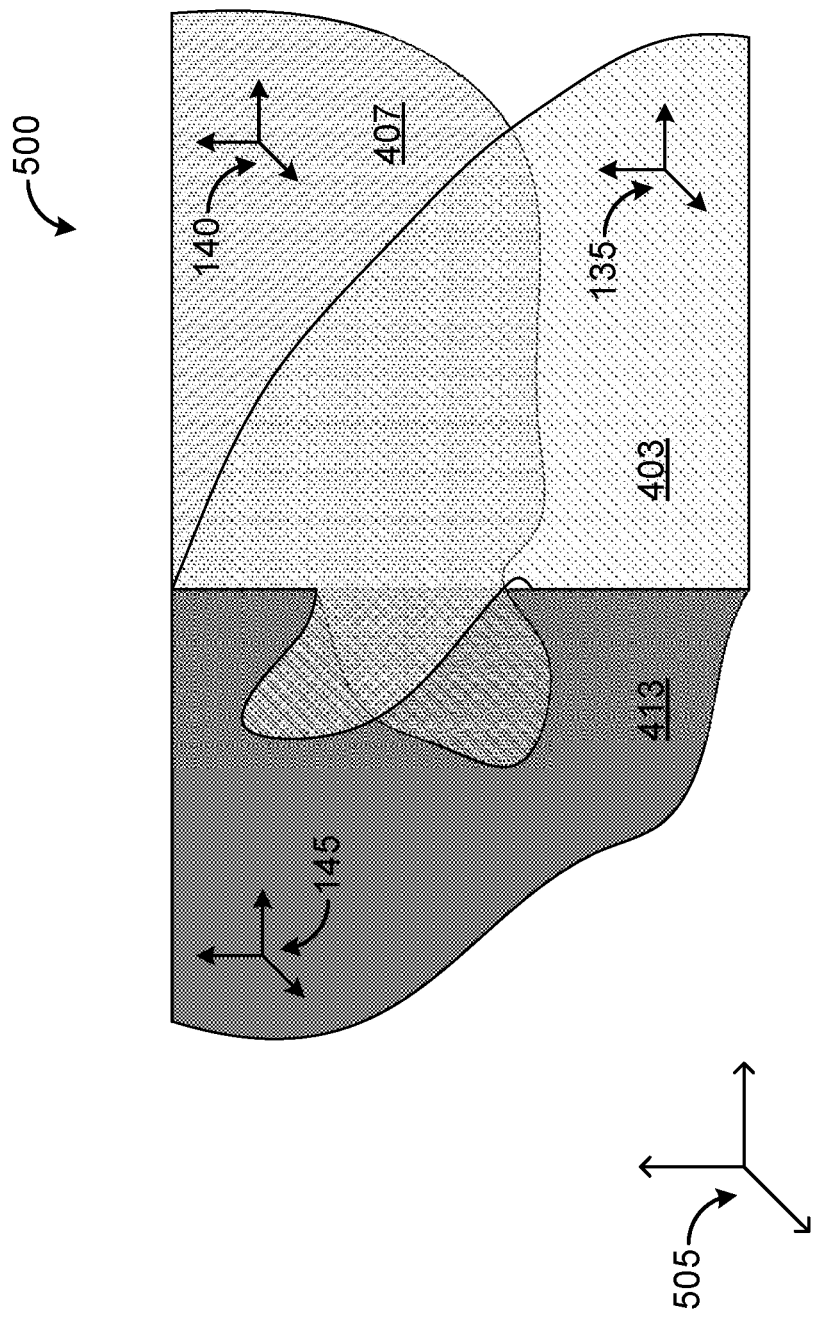
FIG. 5 shows an example global volume including the local volumes of FIG. 4.

As an example, FIG. 5 shows an example global volume 500 including the local volumes of FIG. 4 (e.g., local volumes 403, 407, and 413). Global coordinate system 505 may be generated based on local coordinate systems 135, 140, and 145).

Returning to FIG. 3, at 340, method 300 includes extracting a surface mesh for the global volume. As an example, surface extraction may be implemented using any suitable algorithm, such as dual contouring or Marching Cubes. In one non-limiting implementation of Marching Cubes, each cube of 8 voxels is analyzed. If one or more voxels within a voxel cube has a value less than a predetermined isovalue (e.g., on one side of an isosurface) and one or more voxels within the voxel cube has a value greater than the predetermined isovalue (e.g., on the other side of the isosurface) it can be assumed that the voxel cube contributes at least a portion of the isosurface. Furthermore, a cube of such voxels can contribute to at least a portion of the isosurface even if the cube does not contain values on both sides of the target isovalue—that is, its neighbor may contain a value on the other side. The boundary voxels can contribute to surfaces, and in one formulation may be more heavily weighted in the summation towards the threshold to account for this.

Based on the voxel isovalues, it can be determined which edges of the voxel cube intersect the isosurface, and polygonal contours may be created dividing the voxel cube between regions within the isosurface and regions outside of the isosurface. The isosurface may be visually represented by a 3D reconstruction mesh (surface mesh). As the voxel grid is updated based on new depth information for the environment, the Marching Cubes algorithm can be re-executed to determine updated boundaries of the isosurfaces, and updated surface meshes can be generated.

At 350, method 300 includes determining one or more regions of inconsistency within the global volume. As an example, the regions of inconsistency may comprise voxels associated with two or more adjacent local volumes. The voxels associated with two or more adjacent local volumes may have two or more assigned values that are inconsistent, incompatible, or otherwise unfusable. For example, it may be determined that signed distance field values for voxels within a first local volume are more than a threshold different from signed distance field values for the same voxels within a second local volume. Fusing inconsistent data may destroy the geometry from one local volume using corrupted or otherwise erroneous data from another local volume.

In other examples, the region of inconsistency may be inferred based on data from within a local volume and/or from an adjacent local volume. As described further herein, and with regard to FIGS. 6 and 7, determining a region of inconsistency may include determining a presence of a mirror and/or determining a presence of voxels within a local volume that are on opposite sides of a wall from a primary region of the local volume. Additionally or alternatively, determining a region of inconsistency may include determining discontinuity between adjacent local volumes, such as a failure to align features and/or surfaces that are shared between adjacent local volumes, such as the appearance of a double floor.

At 360, method 300 includes localizing the determined regions of inconsistency to one or more erroneous local volumes. In order to re-piece destroyed geometry, it may be assumed that one of the overlapping local volumes has the correct information, and the other has incorrect information. Volumetric fusion averages the values for each voxel. To determine the erroneous local volume, the number of voxels which undergo positive to negative changes (or vice-versa) may be determined by counting the number of zero crossings that did not exist prior to fusion. For example, pairs of neighbor voxels may be averaged. If both voxels are positive or negative, there is no longer a zero crossing, and it can be assumed that the associated triangle was destroyed. This phenomenon can also happen with noisy data, so a threshold may be established for a number of destroyed triangles needed to identify an erroneous local volume.

Figure 6:
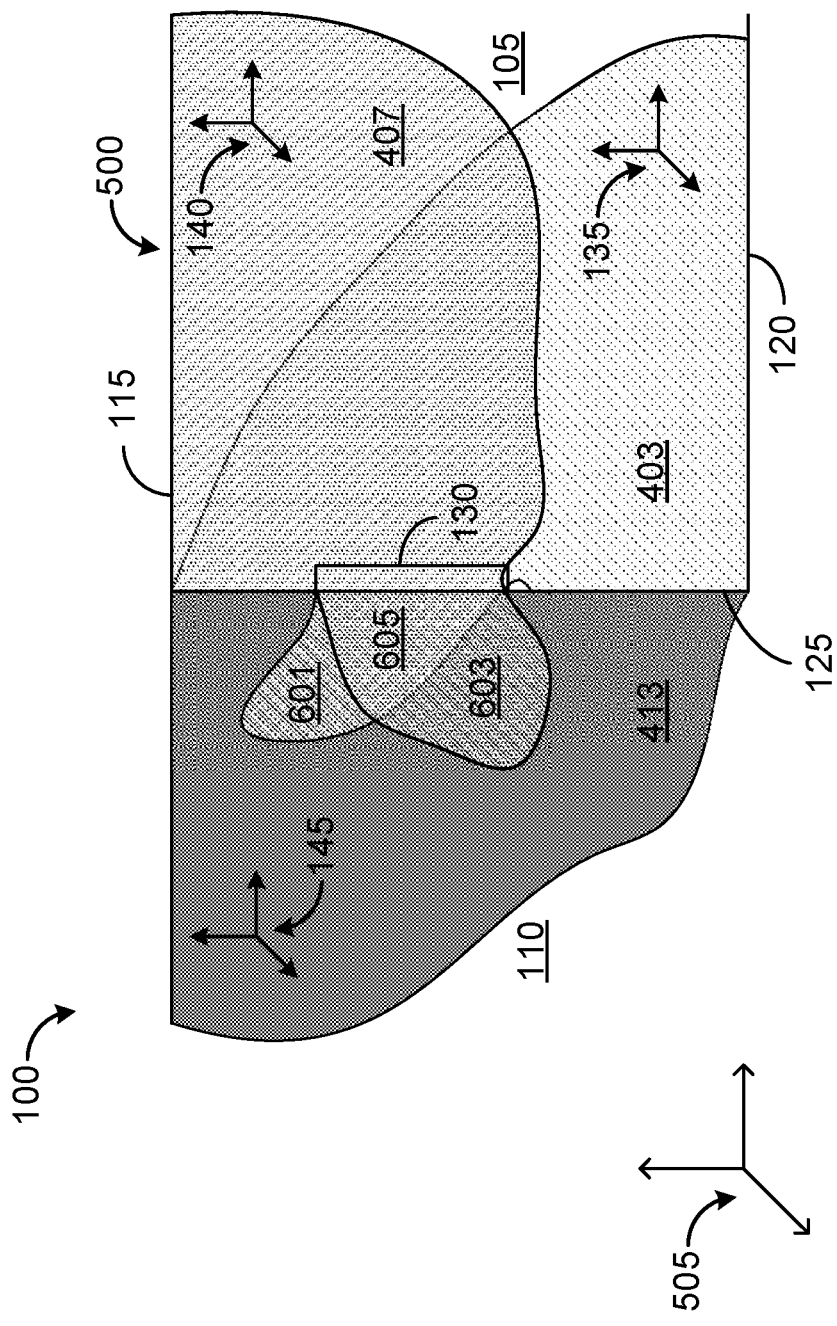
FIG. 6 shows example regions of inconsistency within the global volume of FIG. 5.

FIG. 6 shows example regions of inconsistency within global volume 500. As described, environment 100 includes walls 115, 120, and 125, as well as mirror 130 positioned within first room 105 on third wall 125. The reflections in mirror are given depth values that are effectively within second room 110 on the opposite side of third wall 125. This leads to a first region of inconsistency 601 between first local volume 403 and third local volume 413, a second region of inconsistency 603 between second local volume 407 and third local volume 413, and a third region of inconsistency 605 between first local volume 403, second local volume 407, and third local volume 413. When trying to fuse first local volume 403, second local volume 407, and third local volume 413, a conflict arises. The values for voxels within first region of inconsistency 601, second region of inconsistency 603, and third region of inconsistency 605 are disparate, and attempting to average them may generate non-sensical data. Portions of objects that would create a surface within third local volume 413 (e.g., third wall 125) may be destroyed or erased upon fusing the data with data from regions of inconsistency 601 and 603.

Figure 7:
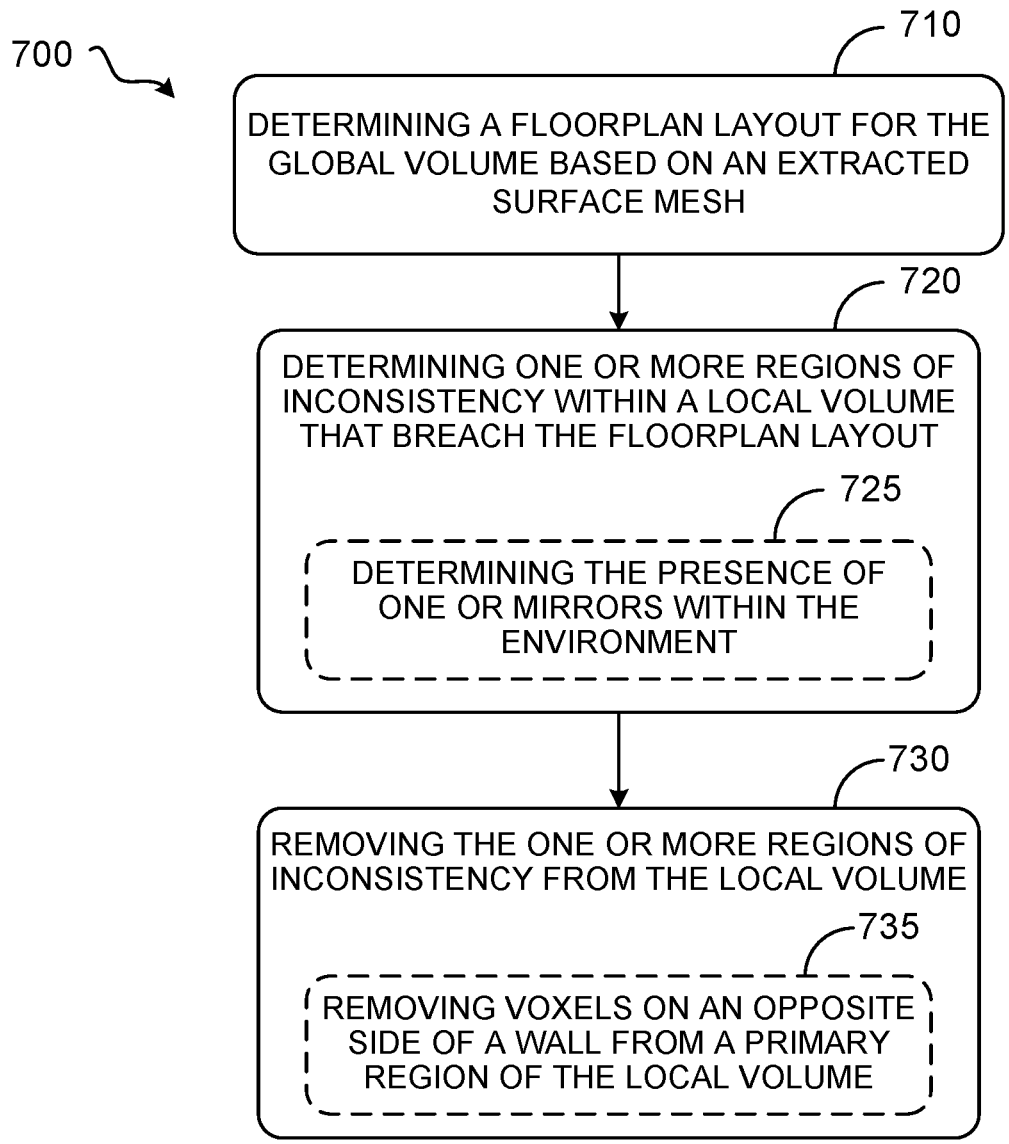
FIG. 7 shows an example method for determining regions of inconsistency within a local volume.

FIG. 7 shows an example method 700 for determining regions of inconsistency within a local volume. As per method 300, method 700 may be performed by a computing device communicatively coupled to an imaging device, such as head-mounted display system 200. Method 700 may use an extracted mesh from a fused global volume generated from a plurality of local volumes as input (e.g., extracted mesh output at 340 of method 300).

At 710, method 700 includes determining a floorplan layout for the global volume based on an extracted surface mesh. For example, one or more floorplan surfaces within the environment, such as walls, ceilings, floors, etc. may be determined. Large planar regions within the extracted mesh may be determined and used to construct a floorplan layout that only contains walls, floors, ceilings, etc.

At 720, method 700 includes determining one or more regions of inconsistency within a local volume that breach the floorplan layout. For example, for each local volume, a set of voxels may be identified that should not be visible from the original camera pose based on the floorplan layout. It may be determined that a local volume includes regions of voxels on opposing sides of one or more floorplan surfaces. In other words, voxels may be detected that should be behind a wall based on the perspective of an imaging device.

At 725, method 700 optionally includes determining the presence of one or more mirrors within the environment. In some examples, the presence of one or more mirrors within the environment may be determined using one or more algorithms, such as a machine learning algorithm and/or one or more deep neural networks. A machine learning classifier may be used on the input depth images to detect wall-mounted mirrors. Machine learning algorithms may enable distinguishing between mirrors and doorways.

Additionally or alternatively, presence of one or more mirrors within the environment may be determined based on a determined floorplan layout for the global volume based on the extracted surface mesh. For example, referring to FIG. 6, mirror 130 may be inferred based on regions of inconsistency 601, 603, and 605, along with the floorplan layout that includes wall 125. Further, wall-mounted mirrors may have constant points along the surface, and then variety of depth values within the mirror. These values may enhance mirror detection rather than performing detection based on depth values alone.

The position, location, and coordinates of the detected mirror may be recorded and applied to subsequent depth images of the environment. If the mirror is not designated as such, the geometry of the volume behind the mirror may be destroyed again the next time the mirror is observed.

At 730, method 700 includes removing the one or more regions of inconsistency from the local volume. As one example, inside-mirror voxels may be erased from the local volume by using the detected floorplan surfaces to delete the geometry that should be behind the surface from the viewpoint of an imaging device in a local coordinate system.

At 735, method 700 may optionally include removing voxels on an opposite side of a floorplan surface from a primary region of the local volume. These voxels may be un-fused from the global volume by subtracting their values from the weighted average.

Returning to FIG. 3, at 370, method 300 includes unfusing the one or more erroneous local volumes from the global volume. For example, the erroneous volumes and local volumes that overlap with the determined regions of inconsistency may be unfused from the global volume. Unfusing these local volumes from the global volume may further include reducing a weight of the signed distance field values for voxels associated with the one or more erroneous local volumes within the determined regions of inconsistency.

Figure 8:
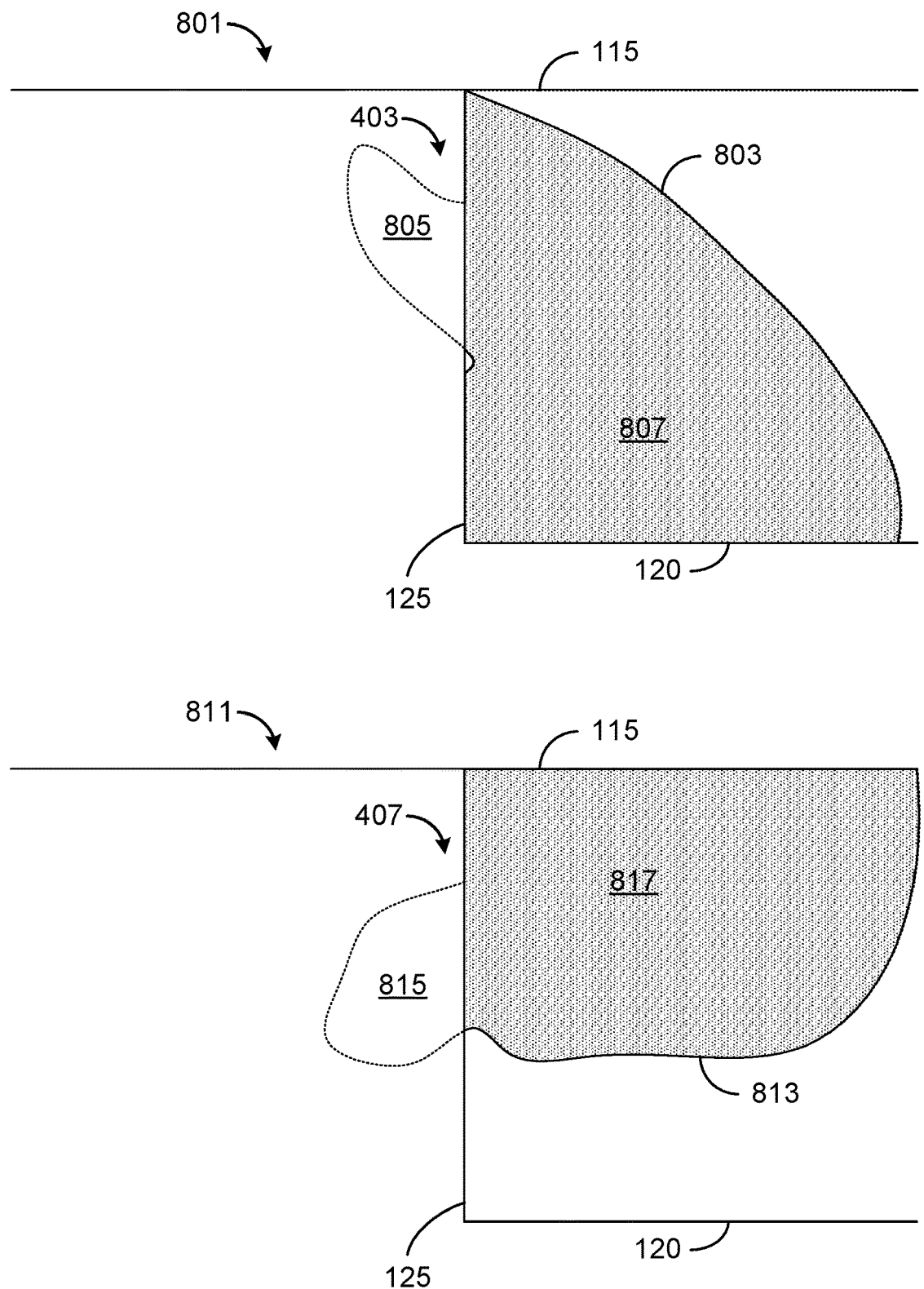
FIG. 8 shows corrected versions of erroneous local volumes.

FIG. 8 shows an example of corrected versions of erroneous local volumes. At 801, local volume 403 is shown to include primary region 803 and region of inconsistency 805 on opposing sides of third wall 125. Removing region of inconsistency 805 yields first corrected local volume 807. At 811, local volume 407 is shown to include primary region 813 and region of inconsistency 815 on opposing sides of third wall 125. Removing region of inconsistency 815 yields second corrected local volume 817.

Returning to FIG. 3, at 380, method 300 includes re-fusing non-erroneous local volumes into a corrected global volume. In some examples, the non-erroneous local volumes may include a corrected version of an unfused erroneous local volume (e.g., corrected local volumes 807 and 817). In such examples, the erroneous volumes may be un-fused, and then the corrected local volumes re-fused into the global volume. However, the non-erroneous local volumes may exclude one or more erroneous local volumes. For example, local volumes that include objects inside of a mirror may not be fused into global volumes. In such examples, all local volumes may be re-fused into a global volume after the erroneous local volumes are removed. In some examples, such as when mis-alignment of a static object (e.g., floor, wall, ceiling) is detected, the relative position of the local coordinate systems may be updated so that in the floor aligns in the fused global volume, and a new global coordinate system may be generated. As an example, responsive to receiving updated relative positions of two or more local coordinate systems, non-erroneous local volumes may be re-fused into a corrected global volume based on the updated relative positions of the two or more local coordinate systems. In some examples, it may be determined that none of the local volumes encompassing the region of inconsistency are erroneous. In such examples, the weight given to voxel values for the local volumes may be adjusted without deleting any voxel data, transformations may be adjusted, etc.

Figure 9:
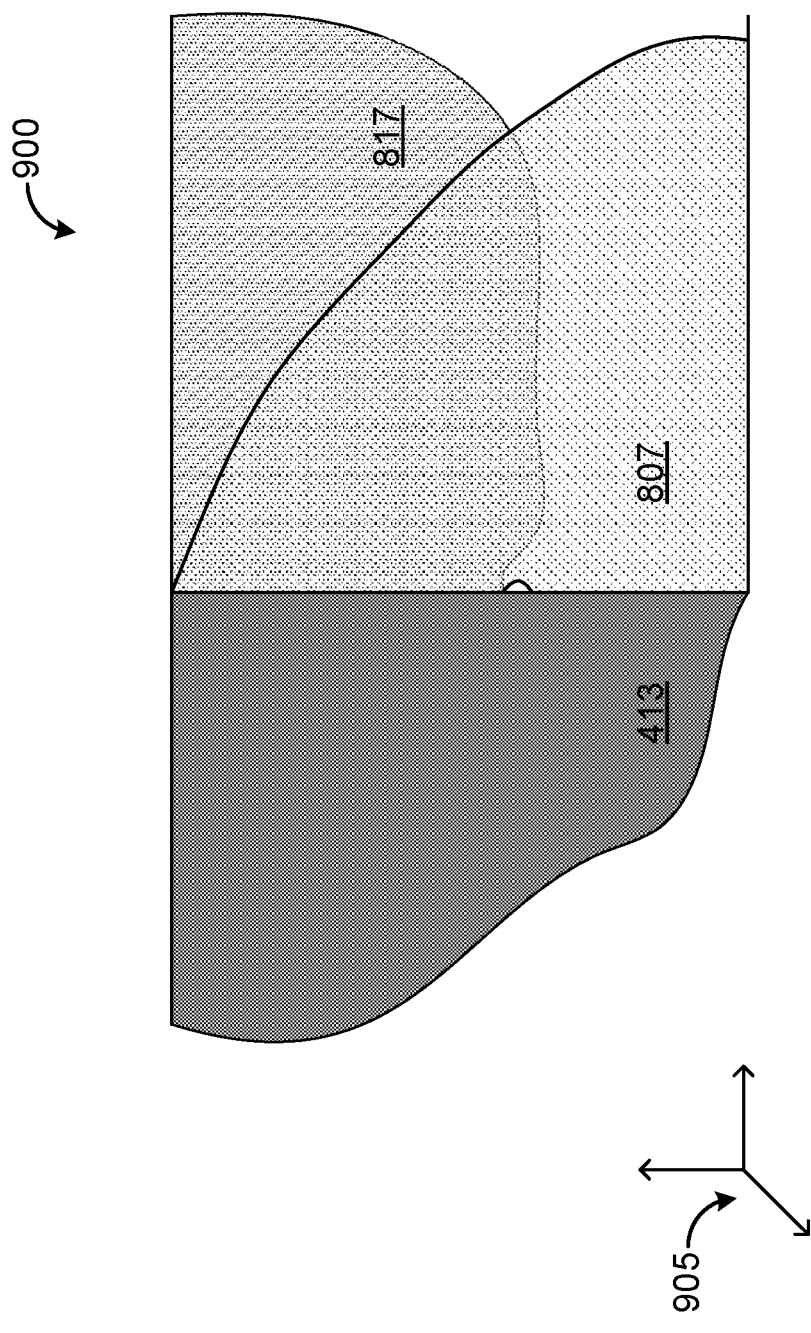
FIG. 9 shows a corrected global volume including non-erroneous local volumes.

FIG. 9 shows a corrected global volume including non-erroneous local volumes. Third local volume 413, first corrected local volume 807, and second corrected local volume 817 are re-fused into corrected global volume 900 having global coordinate system 905.

Returning to FIG. 3, at 390, method 300 includes re-extracting the surface mesh for the global volume. At this stage the extracted mesh will not contain false geometry caused by mirror reflections and/or other regions of inconsistency because the inconsistencies were removed from the global volume. However, in some examples, some regions of the environment may need to be rescanned to fully regenerate damaged geometry. Unchanged regions of the global volume may be maintained from previous mesh extractions, thereby realizing additional computational savings.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
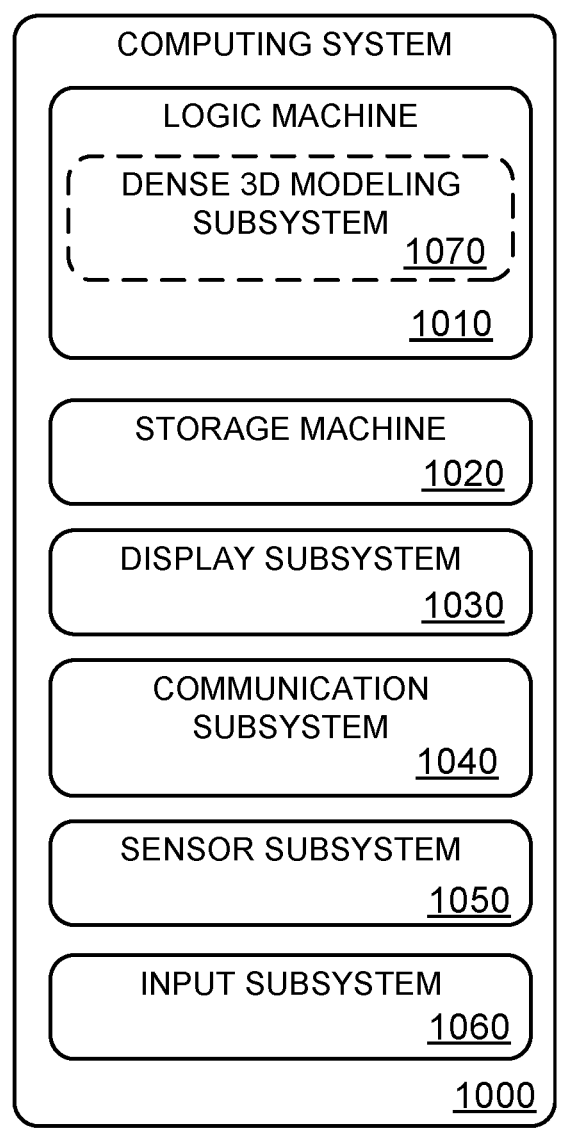
FIG. 10 schematically shows a computing system useable to spatially map an environment for a 3-Dimensional rendering.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices.

Computing system 1000 includes a logic machine 1010 and a storage machine 1020. Computing system 1000 may optionally include a display subsystem 1030, communication subsystem 1040, sensor subsystem 1050, input subsystem 1060, and/or other components not shown in FIG. 10. Computing system 1000 may include a dense 3D modeling subsystem 1070, which may be included in logic machine 1010.

Logic machine 1010 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1020 includes one or more physical devices configured to hold instructions executable by the logic machine to implement the methods and processes described herein. When such methods and processes are implemented, the state of storage machine 1020 may be transformed—e.g., to hold different data.

Storage machine 1020 may include removable and/or built-in devices. Storage machine 1020 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1020 may include volatile, nonvolatile, dynamic, static, read/write, read-only, random-access, sequential-access, location-addressable, file-addressable, and/or content-addressable devices.

It will be appreciated that storage machine 1020 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1010 and storage machine 1020 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 implemented to perform a particular function. In some cases, a module, program, or engine may be instantiated via logic machine 1010 executing instructions held by storage machine 1020. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1030 may be used to present a visual representation of data held by storage machine 1020. This visual representation may take the form of a graphical user interface (GUI). As the herein described methods and processes change the data held by the storage machine, and thus transform the state of the storage machine, the state of display subsystem 1030 may likewise be transformed to visually represent changes in the underlying data. Display subsystem 1030 may include one or more display devices utilizing virtually any type of technology. Such display devices may be combined with logic machine 1010 and/or storage machine 1020 in a shared enclosure, or such display devices may be peripheral display devices.

When included, communication subsystem 1040 may be configured to communicatively couple computing system 1000 with one or more other computing devices. Communication subsystem 1040 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

When included, sensor subsystem 1050 may include one or more sensors configured to sense different physical phenomenon (e.g., visible light, infrared light, sound, acceleration, orientation, position, etc.) as described herein. For example, sensor subsystem 1050 may include one or more inward facing optical sensors, one or more outward facing optical sensors, and one or more positional sensors. Sensor subsystem 1050 may be configured to provide sensor data to logic machine 1010, for example. As described herein, such data may include gaze tracking information, depth tracking information, image information, audio information, ambient lighting information, position information, motion information, user location information, and/or any other suitable sensor data that may be used to perform the methods and processes described above.

When included, input subsystem 1060 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, dense 3D modeling subsystem 1070 may receive information from storage machine 1020, communication subsystem 1040, sensor subsystem 1050, and/or input subsystem 1060. In particular, dense 3D modeling subsystem 1070 may receive depth information pertaining to an environment such as depth image frames and 6DOF camera pose data. Dense 3D modeling subsystem 1070 may use the received information to form a 3D model which may be stored on storage machine 1020, and may be output to display subsystem 1030 and/or communication subsystem 1040. The 3D model may be updated upon receipt of new depth information as described herein.

In one example, a method comprises receiving a plurality of depth images of an environment via an imaging device, each depth image associated with a local coordinate system; for each local coordinate system, fusing each associated depth image to generate a local volume; fusing each local volume into a global volume having a global coordinate system; extracting a surface mesh for the global volume; determining one or more regions of inconsistency within the global volume; localizing the determined regions of inconsistency to one or more erroneous local volumes; unfusing the one or more erroneous local volumes from the global volume; and re-fusing non-erroneous local volumes into a corrected global volume. In such an example, or any other example, the method may additionally or alternatively comprise, responsive to receiving a new depth image, fusing the new depth image into the local volume for the local coordinate system associated with the new depth image. In any of the preceding examples, or any other example, the method may additionally or alternatively comprise, responsive to receiving updated relative positions of two or more local coordinate systems, re-fusing non-erroneous local volumes into a corrected global volume based on the updated relative positions of the two or more local coordinate systems. In any of the preceding examples, or any other example, the non-erroneous local volumes may additionally or alternatively include a corrected version of an unfused erroneous local volume. In any of the preceding examples, or any other example, the non-erroneous local volumes may additionally or alternatively exclude the one or more erroneous local volumes. In any of the preceding examples, or any other example, determining one or more regions of inconsistency within the global volume may additionally or alternatively includes determining a presence of one or more mirrors within the environment. In any of the preceding examples, or any other example, the presence of one or more mirrors within the environment may additionally or alternatively be determined using one or more deep neural networks. In any of the preceding examples, or any other example, the presence of one or more mirrors within the environment may additionally or alternatively be determined based on a determined floorplan layout for the global volume based on the extracted surface mesh.

In another example, a method comprises receiving a plurality of depth images of an environment from an imaging device, each depth image associated with a local coordinate system; for each local coordinate system, fusing each associated depth image to generate a local volume comprising a plurality of voxels; using a weighted average for signed distance field values for voxels within overlapping regions, fusing each local volume into a global volume having a global coordinate system; extracting a surface mesh for the global volume; determining one or more regions of inconsistency within the global volume, the regions of inconsistency comprising voxels associated with two or more adjacent local volumes; localizing the determined regions of inconsistency to one or more erroneous local volumes; unfusing the erroneous local volumes and local volumes that overlap with the determined regions of inconsistency from the global volume; reducing a weight of the signed distance field values for voxels associated with the one or more erroneous local volumes within the determined regions of inconsistency; re-fusing the unfused local volumes into the global volume; and re-extracting the surface mesh for the global volume. In such an example, or any other example, determining one or more regions of inconsistency within the global volume may additionally or alternatively include determining a presence of one or more mirrors within the environment. In any of the preceding examples, or any other example, the presence of one or more mirrors within the environment may additionally or alternatively be determined using one or more deep neural networks. In any of the preceding examples, or any other example, the presence of one or more mirrors within the environment may additionally or alternatively be determined based on a determined floorplan layout for the global volume based on the extracted surface mesh. In any of the preceding examples, or any other example, reducing the weight of the signed distance field values for voxels associated with the one or more erroneous local volumes within the determined regions of inconsistency may additionally or alternatively include editing the erroneous local volume to remove voxels on an opposite side of a floorplan surface from a primary region of erroneous local volume. In any of the preceding examples, or any other example, determining one or more regions of inconsistency may additionally or alternatively include determining that signed distance field values for a set of voxels within a first local volume are more than a threshold different from signed distance field values for a same set of voxels within a second local volume.

In yet another example, a method, comprises receiving a plurality of depth images of an environment from an imaging device, each depth image associated with a local coordinate system; for each local coordinate system, fusing each associated depth image to generate a local volume; fusing each local volume into a global volume having a global coordinate system; extracting a surface mesh for the global volume; determining a floorplan layout for the global volume based on the extracted surface mesh; determining one or more regions of inconsistency within a local volume that breaches the floorplan layout; removing the one or more regions of inconsistency from the local volume; and re-extracting the surface mesh for the global volume. In such an example, or any other example, determining the floorplan layout for the global volume based on the extracted surface mesh may additionally or alternatively include determining one or more walls within the environment. In any of the preceding examples, or any other example, determining one or more regions of inconsistency within the local volume that breaches the floorplan layout may additionally or alternatively include determining a presence of one or mirrors within the environment. In any of the preceding examples, or any other example, determining the presence of one or more mirrors within the environment may additionally or alternatively include applying a location of the one or more determined mirrors to subsequent depth images of the environment. In any of the preceding examples, or any other example, determining one or more regions of inconsistency within a local volume that breach the floorplan layout may additionally or alternatively include determining that a local volume includes regions on opposing sides of one or more floorplan surfaces. In any of the preceding examples, or any other example, removing the region of inconsistency from the local volume may additionally or alternatively include removing voxels on an opposite side of a floorplan surface from a primary region of the local volume.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method, comprising:
receiving a plurality of depth images of an environment via an imaging device, each depth image associated with a local coordinate system;
for each local coordinate system, fusing each associated depth image to generate a local volume;
fusing each local volume and local coordinate system into a global volume having a global coordinate system;
extracting a surface mesh for the global volume;
determining one or more regions of inconsistency between first and second adjacent local volumes within the global volume, each region of inconsistency characterized by a portion of the surface mesh within the first local volume having a first set of depth values determined based on the fused depth images for the first local volume, and a second set of depth values inferred based on the fused depth images for the second local volume, the first set of depth values being different from the second set of depth values by more than a threshold;
localizing the determined regions of inconsistency to one or more erroneous local volumes;
unfusing the one or more erroneous local volumes from the global volume; and
re-fusing non-erroneous local volumes into a corrected global volume.

2. The method of claim 1, further comprising:
responsive to receiving a new depth image, fusing the new depth image into the local volume for the local coordinate system associated with the new depth image.

3. The method of claim 1, further comprising:
responsive to receiving updated relative positions of two or more local coordinate systems, re-fusing non-erroneous local volumes into a corrected global volume based on the updated relative positions of the two or more local coordinate systems.

4. The method of claim 1, wherein the non-erroneous local volumes include a corrected version of an unfused erroneous local volume.

5. The method of claim 1, wherein the non-erroneous local volumes exclude the one or more erroneous local volumes.

6. The method of claim 1, wherein determining one or more regions of inconsistency between the first and second adjacent local volumes within the global volume includes determining a presence of one or more mirrors within the environment.

7. The method of claim 6, wherein the presence of one or more mirrors within the environment is determined using one or more deep neural networks.

8. The method of claim 6, wherein the presence of one or more mirrors within the environment is determined based on a determined floorplan layout for the global volume based on the extracted surface mesh.

9. A method, comprising:
- receiving a plurality of depth images of an environment from an imaging device, each depth image associated with a local coordinate system;
- for each local coordinate system, fusing each associated depth image to generate a local volume comprising a plurality of voxels;
- using a weighted average for signed distance field values for voxels within overlapping regions, fusing each local volume into a global volume having a global coordinate system;
- extracting a surface mesh for the global volume;
- determining one or more regions of inconsistency between first and second adjacent local volumes within the global volume, the regions of inconsistency characterized by a set of voxels within the first local volume having a first set of signed distance field values, and a second set of signed distance field values inferred based on the fused depth images for the second local volume, the first set of signed distance field values being different from the second set of signed distance field values by more than a threshold;
- localizing the determined regions of inconsistency to one or more erroneous local volumes;
- unfusing the erroneous local volumes and local volumes that overlap with the determined regions of inconsistency from the global volume;
- reducing a weight of the signed distance field values for voxels associated with the one or more erroneous local volumes within the determined regions of inconsistency;
- re-fusing the unfused local volumes into the global volume; and
- re-extracting the surface mesh for the global volume.

10. The method of claim 9, wherein determining one or more regions of inconsistency within the global volume includes determining a presence of one or more mirrors within the environment.

11. The method of claim 10, wherein the presence of one or more mirrors within the environment is determined using one or more deep neural networks.

12. The method of claim 10, wherein the presence of one or more mirrors within the environment is determined based on a determined floorplan layout for the global volume based on the extracted surface mesh.

13. The method of claim 10, wherein reducing the weight of the signed distance field values for voxels associated with the one or more erroneous local volumes within the determined regions of inconsistency includes editing the erroneous local volume to remove voxels on an opposite side of a floorplan surface from a primary region of erroneous local volume.

14. The method of claim 9, wherein determining one or more regions of inconsistency includes determining that signed distance field values for the set of voxels within a first local volume are more than a threshold different from signed distance field values for a same set of voxels within the second local volume.

15. A method, comprising:
- receiving a plurality of depth images of an environment from an imaging device, each depth image associated with a local coordinate system;
- for each local coordinate system, fusing each associated depth image to generate a local volume;
- fusing each local volume and local coordinate system into a global volume having a global coordinate system;
- extracting a surface mesh for the global volume;
- determining a floorplan layout for the global volume based on the extracted surface mesh;
- determining one or more regions of inconsistency within a first local volume that breaches the floorplan layout into a second local volume, based on determining that a set of depth values within the first local volume are more than a threshold different from a set of depth values for a same set of voxels within the second local volume;
- removing the one or more regions of inconsistency from the local volume; and
- re-extracting the surface mesh for the global volume.

16. The method of claim 15, wherein determining the floorplan layout for the global volume based on the extracted surface mesh includes determining one or more walls within the environment.

17. The method of claim 15, wherein determining one or more regions of inconsistency within the local volume that breaches the floorplan layout includes determining a presence of one or mirrors within the environment.

18. The method of claim 17, wherein determining the presence of one or more mirrors within the environment includes applying a location of the one or more determined mirrors to subsequent depth images of the environment.

19. The method of claim 15, wherein determining one or more regions of inconsistency within a local volume that breach the floorplan layout includes determining that a local volume includes regions on opposing sides of one or more floorplan surfaces.

20. The method of claim 19, wherein removing the region of inconsistency from the local volume includes removing voxels on an opposite side of a floorplan surface from a primary region of the local volume.

* * * * *